US011669399B2

(12) United States Patent
Munnangi et al.

(10) Patent No.: US 11,669,399 B2
(45) Date of Patent: Jun. 6, 2023

(54) SYSTEM AND METHOD FOR FAULT IDENTIFICATION AND FAULT HANDLING IN A MULTIPORT POWER SOURCING DEVICE

(71) Applicant: SILICONCH SYSTEMS PVT LTD, Karnataka (IN)

(72) Inventors: Sirisha Munnangi, Andhra Pradesh (IN); Rakesh Kumar Polasa, Karnataka (IN); Kaustubh Kumar, Uttar Pradesh (IN)

(73) Assignee: SILICONCH SYSTEMS PVT LTD, Karnataka (IN)

( * ) Notice: Subject to any disclaimer, the term of this patent is extended or adjusted under 35 U.S.C. 154(b) by 0 days.

(21) Appl. No.: 17/665,431

(22) Filed: Feb. 4, 2022

(65) Prior Publication Data
US 2023/0068583 A1 Mar. 2, 2023

(51) Int. Cl.
*G06F 11/20* (2006.01)
*G06F 11/14* (2006.01)
(Continued)

(52) U.S. Cl.
CPC ........ *G06F 11/141* (2013.01); *G06F 11/3027* (2013.01); *G06F 11/3051* (2013.01); *G06F 11/0757* (2013.01); *G06F 11/2005* (2013.01)

(58) Field of Classification Search
CPC ............... G06F 11/141; G06F 11/3051; G06F 11/0757; G06F 11/2002; G06F 11/2005
See application file for complete search history.

(56) References Cited

U.S. PATENT DOCUMENTS

| 5,949,974 | A | * | 9/1999 | Ewing | G06F 1/3209 |
| | | | | | 713/340 |
| 6,381,218 | B1 | * | 4/2002 | McIntyre | G06F 11/3055 |
| | | | | | 370/216 |

(Continued)

OTHER PUBLICATIONS

Universal Serial Bus Type-C Cable and Connector Specification Release 2.0, USB 3.0 Promoter Group, Aug. 2019 (373 pages).

(Continued)

*Primary Examiner* — Joseph O Schell
(74) *Attorney, Agent, or Firm* — Procopio, Cory, Hargreaves & Savitch LLP (57) ABSTRACT

System and method for fault identification and fault handling in MPSD are provided. The system includes: a multiport power sourcing device including multiple ports, a master is configured to: send a slave discovery request to multiple slave ports, receive a slave discovery response from the multiple slave ports; reset the watchdog timer in the multiple ports by sending watchdog refresh instruction periodically; each of the multiple ports experience watchdog timer timeout upon failing to receive the watchdog refresh instruction, generate their corresponding port reset upon watchdog timer timeout, to resolve one or more faults associated with the corresponding port; the multiple ports include a role change staggered timer which is triggered upon the corresponding watchdog timer timeout, and reset upon receiving the watchdog refresh instruction from master; the slave ports for which role change staggered timer times out first, changes the role to start functioning as the new master port.

18 Claims, 4 Drawing Sheets

(51) Int. Cl.
*G06F 11/30* (2006.01)
*G06F 11/07* (2006.01)

(56) References Cited

U.S. PATENT DOCUMENTS

| | | | |
|---|---|---|---|
| 7,099,934 B1* | 8/2006 | Ewing ........................ | G06F 1/26 307/37 |
| 2014/0365813 A1* | 12/2014 | Sim ........................ | G06F 11/079 714/5.1 |
| 2015/0137791 A1* | 5/2015 | Remple ..................... | G06F 1/26 324/76.11 |
| 2017/0220089 A1* | 8/2017 | Mathew .................. | G06F 1/263 |
| 2018/0095855 A1* | 4/2018 | Sanakkayala ........ | G06F 11/1438 |
| 2019/0113960 A1* | 4/2019 | El Kolli ................ | G06F 1/3203 |

OTHER PUBLICATIONS

Universal Serial Bus Power Delivery Specification, Revision 3.0, Version 2.0, Aug. 29, 2019 (657 pages).

* cited by examiner

SYSTEM AND METHOD FOR FAULT IDENTIFICATION AND FAULT HANDLING IN A MULTIPORT POWER SOURCING DEVICE

CROSS REFERENCE TO RELATED APPLICATION(S)

This application claims the benefit of and priority to India Application Serial No. 202141032679, entitled "SYSTEM AND METHOD FOR FAULT IDENTIFICATION AND FAULT HANDLING IN A MULTIPORT POWER SOURCING DEVICE" and filed on Jul. 20, 2021, which is expressly incorporated by reference herein in its entirety.

TECHNICAL FIELD

The present disclosure generally relates to fault identification. More specifically, the present disclosure relates to a system and method for fault identification and fault handling in a multiport power sourcing device.

INTRODUCTION

Introduction includes information that can be useful in understanding the present invention. It is not an admission that any of the information provided herein is prior art or relevant to the presently claimed invention, or that any publication specifically or implicitly referenced is prior art.

Multiport power sourcing device (MPSD) is a single unit that includes multiple similar or different types of ports to enable distribution of power to multiple devices simultaneously. Depending on the properties and parameters of the ports, the device(s) connected, and/or the compatibility to supply power to the device(s) connected, the power distribution among the multiple ports is defined. With the continuous use of the MPSD, there may be temporary or permanent damages or faults which might occur in any of the ports either internally or externally which in turn can obstruct the communication within the MPSD, power distribution within the MPSD, and/or power flow to the connected devices. In such situation, identification of the exact fault has to be mostly examined physically by a user, and upon identification, the fault needs to be rectified accordingly. Since such identification of fault involves human interference, the conventional approach is prone to human errors and is also time consuming. Such limitations make the conventional approach less reliable and less efficient in terms of identification of any fault and call for automatic detection of the faults.

Certain faults, though localized to a single port, can make the entire MPSD unusable until fully rectified through part replacement or manual updates. Also, rectifying may be a tedious process due to the fact of human intervention and human reliability and incurs cost to the end consumer. With the proper utilisation of growth in the technology, the process of handling of such faults can be automated to retain the device usability and maximum possible features, hence minimally impacting the end consumer. The automatic fault identification and handling in multiport power sourcing devices provides a newer, intelligent and cost-effective approach for fault management over the conventional approach.

Therefore, there is a need in the art to provide a reliable and efficient system and method for fault identification and fault handling in a multiport power sourcing device.

Accordingly, some of the objects of the present disclosure, which at least one embodiment herein satisfies are as listed herein below.

It is an object of the present disclosure to provide a system and method for fault identification and fault handling in a multiport power sourcing device.

It is another object of the present disclosure to provide an automated system and method for fault management in the multiport power sourcing device.

It is another object of the present disclosure to provide a simple, cost-effective and a faster system and method for fault identification and fault handling in a multiport power sourcing device.

It is another object of the present disclosure to provide a reliable and efficient system and method for fault management in the multiport power sourcing device.

It is another object of the present disclosure to detect and handle multiple faults such as one of a permanent physical damage in one or more of the plurality of ports, a complete damage of the shared communication interface, a partial damage of the shared interface with only alert line effected causing communication blockage between the master port and the plurality of slave ports, an unresponsive master port either due to temporary hang or permanent physical damage, unresponsive behaviour of one or more of the plurality of slave ports during communication, hang of the physical communication medium due to fault in one or more of the plurality of slave ports, power switch issue in one or more of the plurality of ports, a faulty device connected to the one or more plurality of ports, or a combination thereof, in the multiport power sourcing device.

BRIEF SUMMARY

The present disclosure relates to fault identification. More specifically, the present disclosure relates to a system and method for fault identification and fault handling in a multiport power sourcing device.

This summary is provided to introduce simplified concepts of a system for time bound availability check of an entity, which are further described below in the detailed description. This summary is not intended to identify key or essential features of the claimed subject matter, nor is it intended for use in determining/limiting the scope of the claimed subject matter.

An aspect of this present disclosure pertains to a system and method for fault identification and fault handling in a multiport power sourcing device. The system may include: multi-port power sourcing device including a plurality of ports, where power distribution across the ports in multiport power sourcing device is controlled by a coordinated pair of master and slaves using a request-response communication over a shared communication interface placed within the multiport power sourcing device, where the master is a protocol agnostic and has one instance and the slave has one instance per port, where the slave performs the actual power delivery over the physical interface to the connected device and the master maintains a record of power allocated to each slave and controls the power distribution across the ports, where each of the plurality of the ports comprises a processor associated with master and slaves executing the corresponding instructions, where, master is configured to send a slave discovery request to each of the plurality of the slave ports, receive a slave discovery response from the plurality of the slave ports that are physically present on the multiport power sourcing device and add the data associated with each of the discovered slave ports to a slave port list in the master database upon receiving the slave discovery response from the slave ports, master is configured to reset the watchdog timer in each of the plurality ports at the same time by sending watchdog refresh instruction periodically to each of the plurality of the ports, each of the plurality of the ports generate a watchdog timer timeout notification upon failing to receive the watchdog refresh instruction from the master due to at least one first fault associated with the multiport power sourcing device; each of plurality of the ports generate their corresponding port reset upon watchdog timer timeout, to resolve at least one or more of the first faults associated with the corresponding port; each of the plurality of the slave ports comprises of a Role change staggered timer which is triggered upon watchdog timer timeout of the corresponding port and reset upon receiving the watchdog refresh instruction from the master, where in role change staggered timer times out upon failing to receive watchdog refresh instruction, thereby indicating at least one second fault associated with the multiport power sourcing device; one of the plurality of the slave ports for which role change staggered timer times out first, performs the role change to start functioning as the new master port and redistribute power to plurality of the ports for restoring power equilibrium in the multiport power sourcing device, for handling at least one of the first fault, at least one of the second fault, or a combination thereof corresponding to one of the temporary or permanent faults, within the multiport power sourcing device.

In an aspect of the present disclosure is provided a method for fault identification and fault handling in a multiport power sourcing device. The method may include the steps of: receiving, at the multiport power sourcing device, a slave discovery request in a sequential manner by a plurality of slave ports over a shared communication interface, where the slave discovery request is generated by a master port; receiving, at the multiport power sourcing device, a slave discovery response from the plurality of slave ports as a response for the slave discovery request, upon being physically present on the multiport power sourcing device, for enabling a discovery of a presence of the corresponding plurality of slave ports; adding, at the multiport power sourcing device, data by the master port to a slave port list upon receiving the slave discovery response from the corresponding plurality of slave ports, where the data is associated to each of the discovered slave ports; resetting, at the multiport power sourcing device, a watchdog timer of each of the plurality of ports periodically, upon receiving a watchdog refresh instruction from the master; generating, at the multiport power sourcing device, a timeout notification by one or more of the plurality of ports, when one or more of the plurality of ports fail to receive the watchdog refresh instruction by the master due to at least one first fault associated with the multiport power sourcing device; resolving, at the multiport power sourcing device, one or more of the plurality of slaves failed to receive the watchdog refresh instruction, by generating the corresponding port reset of one or more of the plurality of ports whose watchdog timer timed out; assuming, at the multiport power sourcing device, a new master role by a first of the plurality of slave ports to experience a role change staggered timer timeout, where the role change staggered timer of the corresponding plurality of slave ports is triggered upon watchdog timer timeout and expires upon failing to receive, a Watchdog refresh instruction, thereby indicating at least one second fault, and redistribution, at the multiport power sourcing device, of power to the plurality of ports by the new master port for restoring power equilibrium in the multiport power sourcing device for handling at least one of the first fault, at least one of the second fault, or a combination thereof corresponding to one of temporary faults or permanent faults within the multiport power sourcing device. In an embodiment, method may include, handling third fault, by monitoring the corresponding VBUS lines by each port, where handling the third fault includes identifying power switch faults in the corresponding plurality of ports, requesting pre-defined lesser power by the corresponding plurality of ports until power switch fault is recovered, identifying faulty device connected to the plurality of ports, by the corresponding slave, and, handling the faulty device as per the protocol established between the port and the device connected, or by doing a port latch off or disable causing disconnection of the faulty device, from the multiport power sourcing device. In an embodiment, the method step may include causing, at the multiport power sourcing device, to transmit a slave alive notification to the master port by the plurality of slave ports as an indication of ready state upon the plurality of slave port being reset.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The diagrams are for illustration only, which thus is not a limitation of the present disclosure, and where.

DETAILED DESCRIPTION

In the following description, numerous specific details are set forth in order to provide a thorough understanding of embodiments of the present invention. It will be apparent to one skilled in the art that embodiments of the present invention may be practiced without some of these specific details.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Embodiments of the present invention may be provided as a computer program product, which may include a machine-readable storage medium tangibly embodying thereon instructions, which may be used to program a computer (or other electronic devices) to perform a process. The term "machine-readable storage medium" or "computer-readable storage medium" includes, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

The present disclosure relates to fault identification. More specifically, the present disclosure relates to a system and method for fault identification and fault handling in a multiport power sourcing device.

An aspect of this present disclosure pertains to fault identification. More specifically, the present disclosure relates to a system and method for fault identification and fault handling in a multiport power sourcing device. It should be noted that the term 'system' is substantially similar to the 'multiport power sourcing device'.

Figure 1:
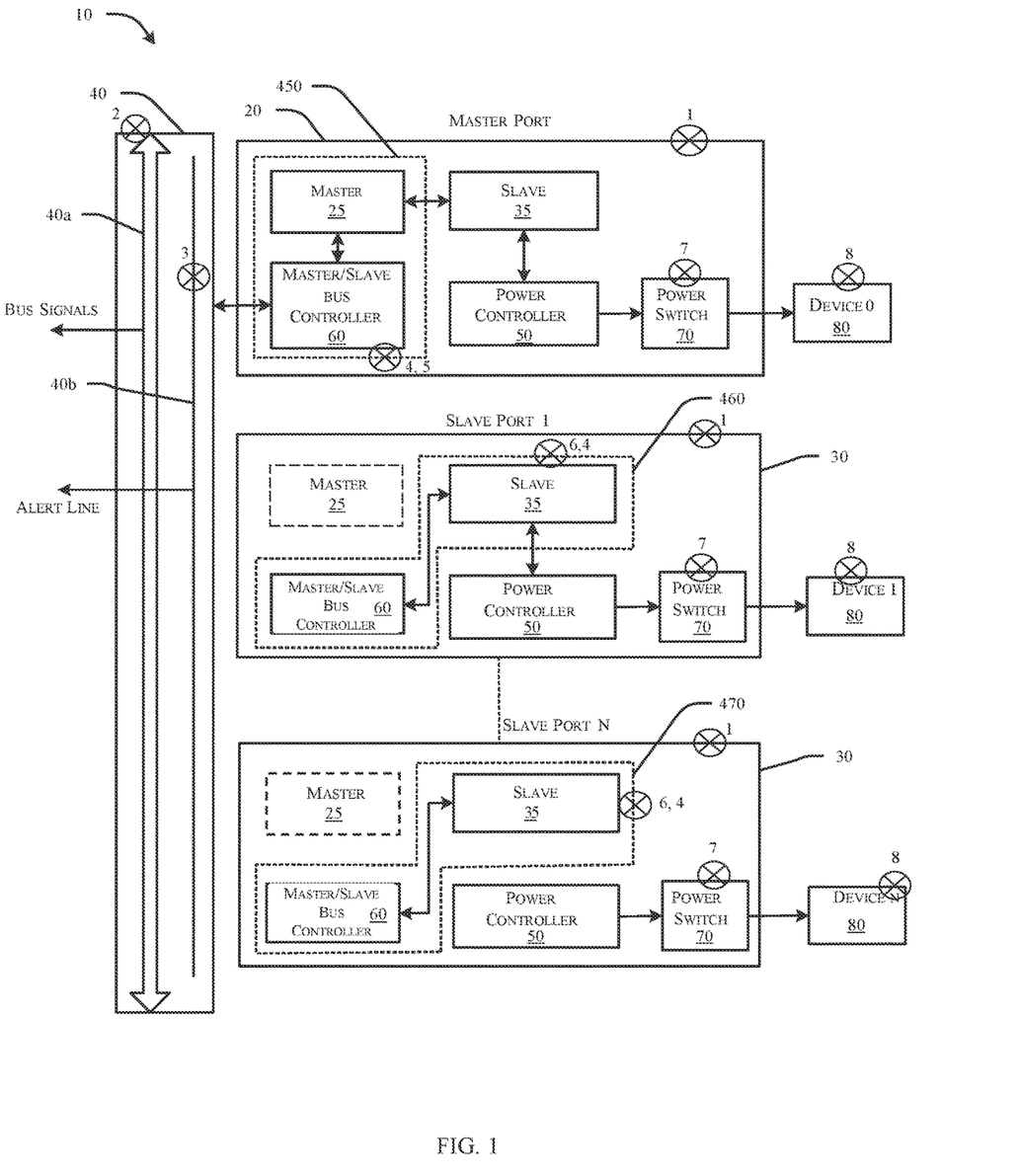
FIG. 1 illustrates an exemplary schematic representation of a block diagram of a Multiport power sourcing device representing the possible faults that can occur in the multiport power sourcing and primary blocks needed for power distribution, fault identification and fault handling in a multiport power sourcing device, in accordance with an embodiment of the present disclosure.

FIG. 1 illustrates an exemplary schematic representation of a multiport power sourcing device 10, which shows various faults that may occur in the multiport power sourcing device 10, the primary blocks needed for power distribution, for fault identification, and for fault handling in the multiport power sourcing device, in accordance with an embodiment of the present disclosure.

It should be noted that master (25) and slave (35) are primarily for power distribution within the multiport power sourcing device 10 across various ports (20, 30) and delivering the allocated power of each port to connected device(s). Additionally, fault detection and handling for the multiport power sourcing device topology is implemented in master and slave. Further, the fault handling logic is implemented in master and slave with help of timers and certain mechanisms implemented in the multiport power sourcing device.

In light of the above, the multiport power sourcing device 10 includes at least one power supply controller unit 50, a master port 20, one or more slave ports 30, at least one master or slave bus controller 60, at least one power switch 70 associated to each of the plurality of ports 20, 30, at least one device 80 connected to each of the plurality of ports 20, 30, a shared communication interface such as busses 40. The elements which include the power supply controller unit 50, the master port 20, the plurality of slave ports 30, the master or slave bus controller 60, the power switch 70 associated to each of the plurality of ports 20, 30, the device 80 of each of the plurality of ports are communicatively connected to each other by means of network buses 40 and other interfaces. More specifically, the multiport power sourcing device 10 includes a plurality of ports that is, a master port 20 and a plurality of slave ports 30. There is one active master 25 instance present in the system controlling the entire power distribution among the ports and one slave 35 instance per each port which deliver power to the devices 80 connected to each port. Master 25 and slaves 35 communicate with each other through shared communication interface through request-response communication where master sends request packets and gets response packets from slaves.

Master 25 and slave 35 may communicate based on alert mechanism, where when any slave needs something to be informed or serviced by the master, the slave pulls the alert line low indicating the alert or an interrupt to master. Master on seeing the alert line sends alert status query to each of the plurality of the slaves and service the alert or the interrupt raised by the each of the plurality of the slaves. The alert line can be inband or outband. In inband, the alert line is defined in a protocol and in outband the alert line is not defined per protocol but a custom implementation of the alert line is highlighted.

Power supply controller unit 50 controls how the allocated power to the port is delivered to the device connected. Power switch 70 is used for the delivering the power to the device connected.

In light of the above, as shown in FIG. 1, all components shown have a function with a certain goal and for example, the power supply controller unit 50 has control over other components with respect to at least one aspect of those components and which will heretofore be described.

FIG. 1 shows a general architecture of the multiport power sourcing device 10 that can provide a multiport power sourcing device and as such, the figure shown is only an indication as to one embodiment and therefore, the components shown in FIG. 1 can be placed in any manner and arrangement that may be appreciated by a person skilled in the art.

The plurality of ports 20, 30 includes the plurality of slave ports 30 and the master port 20. The terms 'master' and 'slave' used herein pertain to a model of asymmetric communication or control where one device or ports or a set of instructions (the 'master') controls one or more other devices or ports or another set of instructions (the 'slaves') and serves as their power sharing control hub. In some systems a master is selected from a group of eligible devices or ports, with the other devices or ports acting in the role of slaves.

In one embodiment, the plurality of ports 20, 30 may correspond to at least one of a Universal Serial Bus (USB) Type-C port, a USB Type-A port. Power distribution across the ports 20, 30 in multiport power sourcing device 10 is controlled by a coordinated pair of master 25 and slaves 35 using request-response communication over the shared communication interface 40 placed within the multiport power sourcing device, where the master 25 is a protocol agnostic and has one instance and the slave 35 has one instance per port, where the slave 35 performs the actual power delivery to the connected device over the physical interface and the master 25 maintains a record of power allocated to each slave 35 and controls the power distribution across all the ports. The power controller unit 50 of each of the plurality of ports 20, 30 is configured by the corresponding slave 35, to supply power via the power switch 70, to the device 80 connected to the corresponding plurality of ports 20, 30 as per the power allocated by the master to the corresponding port. The busses 40 may include one of a bus protocol signals 40a, an alert/interrupt line 40b which can be either in-band with the selected bus protocol or a separate dedicated out-band signal.

In one embodiment, at least one first fault may include one of a permanent physical damage in one or more of the plurality of ports identified as 1, a complete damage of the shared communication interface identified as 2, a partial physical damage of the shared communication interface with only alert line effected identified as 3 causing communication blockage between the master port and the plurality of slave ports, an unresponsive master port either due to temporary hang or permanent physical damage identified as 5, unresponsive behaviour of one or more of the plurality of slave ports during communication identified as 6, hang in the shared communication interface due to fault in one or more of the plurality of ports identified as 4, or a combination thereof, at least one second fault include permanent physical damage of the master port identified under category 1, complete damage of the shared communication interface identified as 2, an unresponsive master port during communication identified as 5, or a combination thereof, at least one third fault include power switch fault identified as 7, device connected fault identified as 8, or a combination thereof. In an embodiment, master 25 and slaves 35 of the plurality of ports, identify and handles the first faults, second faults, third faults or combination of them as explained further. In an embodiment, master is configured to send a slave discovery request to each of the plurality of the slave ports 30, receive a slave discovery response from the plurality of the slave ports 30 that are physically present on the multiport power sourcing 10 and add the data associated with each of the discovered slave ports 30 to a slave port list in the master database upon receiving the slave discovery response from the slave ports 30.

Furthermore, the master 25 is configured to reset a watchdog timer in each of the plurality ports 20, 30 by sending the watchdog refresh instruction periodically to each of the plurality of the ports 20, 30, where each of the plurality of the ports 20, 30 generates a watchdog timer timeout notification upon failing to receive the watchdog refresh instruction from the master due to at least one first fault associated with the multiport power sourcing device 10. More specifically, each of the plurality of ports includes the watchdog timer, hereafter represented as $T_{WDT}$. In one embodiment, the watchdog refresh instruction may correspond to a WATCHDOG_REFRESH packet which may be transmitted by the master port to each of the plurality of ports periodically at every predefined time interval. The pre-defined time interval may be defined by $T_{WDT\_REFRESH}$, where $T_{WDT}=4*T_{WDT\_REFRESH}$. Each of the plurality of ports on receiving the watchdog refresh instruction, resets or restarts the corresponding watchdog timer ($T_{WDT}$).

Each of plurality of the ports 20, 30 generates their corresponding port reset upon watchdog timer timeout, to resolve at least one or more of the first faults associated with the corresponding port. More specifically, the $T_{WDT}$ timeout enables the reset of corresponding plurality of ports experiencing any one of the at least one first fault to recovery from the corresponding fault. In one embodiment, $T_{WDT\_REFRESH}$ is sent to each of the plurality of ports periodically at the same time and hence $T_{WDT}$ expires in each of the plurality of slave ports around same time.

In one embodiment, a role change staggered timer may be represented as $T_{RCST\_n}$ which may get enabled upon $T_{WDT}$ timeout, where $T_{RCST\_n}$ value is staggered across the plurality of slave ports whose value is proportional to $((n+1)*T_0)$, where 'n' represents a unique port ID of the corresponding plurality of slave ports. Where $T_0$ is any configurable value which is greater than $T_{WDT}$. Only power-on reset and WATCHDOG_REFRESH packets can reset the $T_{RCST\_n}$. Any failure in receiving the WATCHDOG_REFRESH packet, even after the port reset upon $T_{WDT}$ timeout, which may result in $T_{RCST\_n}$ to expire indicating either the unresponsive master due to temporary hang or permanent physical damage or a physical damage to the communication interface corresponding to one of the at least one second fault. A slave port among the plurality of slave ports whose $T_{RCST\_n}$ expires first, assumes the role of the new master port, and initializes the slave discovery and starts acting as the master port upon successfully discovering at least one other slave port in the multiport power sourcing device 10.

The MPSD is further instructed to redistribute power to the plurality of slave ports by the new master port for restoring power equilibrium in the MPSD for handling at least one of the first fault, at least one of the second fault, or a combination thereof corresponding to one of temporary faults or permanent faults within the MPSD. More specifically, upon successful completion of the slave discovery, the slave port starts to act as the new master port redistributes power to all the remaining plurality of slave ports, and restores power equilibrium in the MPSD, where power equilibrium may refer to a steady state condition in which further power redistribution across the ports doesn't happen until any new event or alert.

In an embodiment, the MPSD is configured to transmit an alive notification to the master port by the plurality of slave ports as an indication of ready state upon the plurality of slave port being reset. More specifically, each of the plurality of slave ports upon the port reset sends the alert indication to the master port and responds to the master port's alert status query with a SLAVE_ALIVE response indicating that the slave is in active state and is ready for the operation of the Multiport power sourcing device, to enable a SLAVE_ALIVE mechanism.

In an embodiment, each of the plurality of the ports 20, 30 monitors the corresponding VBUS lines over which power is delivered to the connected devices 80, to identify the power switch faults, where power switch fault causes the allocated port power not to be delivered to the connected device 80, and upon identifying the power switch fault, corresponding slave request for a predefined lesser power until power switch fault is recovered, to handle one of the third faults.

In an embodiment, each of the plurality of ports 20, 30 identify the faulty devices 80 connected to the corresponding port and handles the faults as per the protocol established between the connected device and the corresponding port, or by doing a port latch off or disable causing the disconnection of faulty device connected to the corresponding port, to handle one of the third faults.

In one embodiment, the physical damage to the one or more ports from the corresponding one of the at least one first fault, the at least one second fault, or a combination thereof, may include the physical damage in the master port, either before the start of operation or during the operation of MPSD, resulting in failure to receive the watchdog refresh instruction in all the plurality of slave ports causing the watchdog timer to expire and resetting of all the plurality of slave ports, and enabling and causing the role change staggered timer of all the plurality of slave ports to expire, the first of the plurality of slave port to expire role change staggered timer timeout first is assumed to be the new master port, which start acting as new master port upon discovering at least one of the plurality of slave ports and redistributes the power and restores the power equilibrium. More specifically, the physical damage to the master port results in failure of receiving the WATCHDOG_REFRESH packet in each of the plurality of slave ports causing $T_{WDT}$ to expire in each of the plurality ports causing the port reset and also further causes $T_{RCST\_n}$ to expire in one of the plurality of slave ports first. The port whose $T_{RCST\_n}$ expires first assumes the functionality of new master port, starts acting as the new master port. upon discovering at least one more slave ports from the plurality of slave ports, redistribution of the power takes place and restoration of the power equilibrium happens.

In one embodiment, the physical damage to the one or more ports may include the physical damage in one of the plurality of slave ports before the start of operation results in failure in transmitting the slave discovery response, causing master to block the power distribution to the corresponding one of the plurality of slave ports.

In an embodiment, the physical damage to the one or more ports may include the physical damage in one of the plurality of slave ports during the operation corresponds to No Acknowledgement for the communication from master port, causing master to remove the data of the corresponding one of the plurality of slave ports from the slave port list stored in the database, and resetting the power allocation to the corresponding port to zero, after certain predefined number of retries of the communication.

In one embodiment, the damage to the physical communication medium results in, expiring at least one of, the watchdog timer and at least one of the role change staggered timer of all the plurality of ports as no communication takes place between the plurality of ports due to communication interface damage, and switching each of the plurality of ports to work as independent port with assured power distribution. More specifically, physical damage of the complete communication interface/medium between the master port and the plurality of slave ports which may result in the $T_{WDT}$ to expire in each of the plurality of slave ports as WATCHDOG_REFRESH packets cannot be transmitted or received due to the physical communication medium damage. Further, $T_{RCST\_n}$ also expires in each of the plurality of slave ports one after other because none of the plurality of slave ports on $T_{RCST\_n}$ expiry can communicate with other ports due to communication interface damage, and hence cannot take up the role of the new master resulting in no active master in the system. Hence, each of the plurality of slave ports switches to assured power distribution with $$P\_ALLOC\_p = \frac{PTOTAL}{N},$$

where N is a total number of ports sharing the power in the MPSD, P_ALLOC_p is power allocated to port p and PTOTAL is total shared power of the MPSD.

In one embodiment, the hang of the physical communication medium due to fault in one or more of the plurality of slave ports corresponds to one or more of the plurality of slave ports being faulty, to pull down an alert line, blocking the master to send the watchdog refresh instruction to the slaves, and resulting in the watchdog timer of all the plurality of ports to expire, further resulting in port reset of all the plurality of ports to resolve the faulty alert indication to the master port. In one configuration, the master after identifying the invalid alert indication for a pre-defined number of retries, will send a port reset command to each of the plurality of ports including the master port and the plurality of slave ports, for a faster recovery of the fault without waiting for the recovery due to port reset caused by WDT timeout.

In one embodiment, the partial physical damage to the communication interface with only alert line effected causing faulty alert indication due to alert line pulled low permanently due to the physical damage either during the operation or before start of the operation; where during both the situations, the master port after performing the slave discovery and upon identifying the faulty alert indication without any valid alert from the slaves after the pre-defined number of retries, switches to a polling mode and masks the alert line, where the polling mode corresponds to a mode where master port periodically sends query to each of the plurality of ports to check if any alerts or interrupts are present in the slave that are to be serviced by the master, instead of relying on the alert line, where periodicity of the polling can be represented by a polling timer i.e. Tpolling.

In one embodiment, the unresponsive master during the communication, results in failure of receiving the watchdog refresh packet by each of the plurality of slave ports further resulting in the watchdog timer to expire in each of the plurality of slave ports causing port reset and further causes role change staggered timer to expire in the plurality of the slave ports due to failure of receiving watchdog refresh packets from the unresponsive master, where at least one of the plurality of slave ports whose role change staggered timer expires first, assumes new master role and takes up new master role after successfully discovering at least one of the plurality of slave ports on any other port and redistributes the power to all successfully discovered ports. More specifically, unresponsive master port during the communication results in failure of receiving the WATCHDOG_REFRESH packet by each of the plurality of slave ports, causing $T_{WDT}$ to expire in all the ports causing port reset and further may cause $T_{RCST\_n}$ to expire in the plurality of slave ports. The plurality of slave ports whose $T_{RCST\_n}$ expires first assumes the new master port role and takes up the new master role after discovering at least one of plurality of slave ports on any other port and redistributes the power to all successfully discovered plurality of slave ports. The unresponsive master port upon recovery, waits for some configurable amount of time $T_{MASTER\_CHK}$, within which if the master port receives the slave discovery request by the new master port, the old master port may conclude that another master port is present in the system and the old master port stops functioning as the master port and continues to function as a new slave port among the plurality of slave ports. If no other port assumes new master role within $T_{MASTER\_CHK}$, old master port continues to act as the master in the system, performs slave discovery and restores power equilibrium in the system. If one of the plurality of slave ports assumes new master role during the $T_{MASTER\_CHK}$ either new master or old master continues to act as master depending on whichever port wins the communication interface arbitration.

In one embodiment, the one or more unresponsive slaves during the communication, results in the failure of receiving the watchdog refresh packet from master further resulting in $T_{WDT}$ to expire in the corresponding plurality of slave ports causing the corresponding port to reset to resolve the unresponsive behaviour.

In an embodiment, the temporary or permanent power switch issues of the at least one first fault, and the at least one second fault, may result in the allocated power not to be delivered to the device connected to the corresponding one or more of the plurality of ports. The corresponding plurality of ports identifies such faults by monitoring the VBUS line over which power is delivered to the connected device and further on identifying such faults, requests the master port for power allocation of 0 watts which may be represented as P_ALLOC_p=0 until the fault is recovered and the plurality of ports may start to request for P_ALLOC_p>0 after the fault is recovered.

Figure 2A:
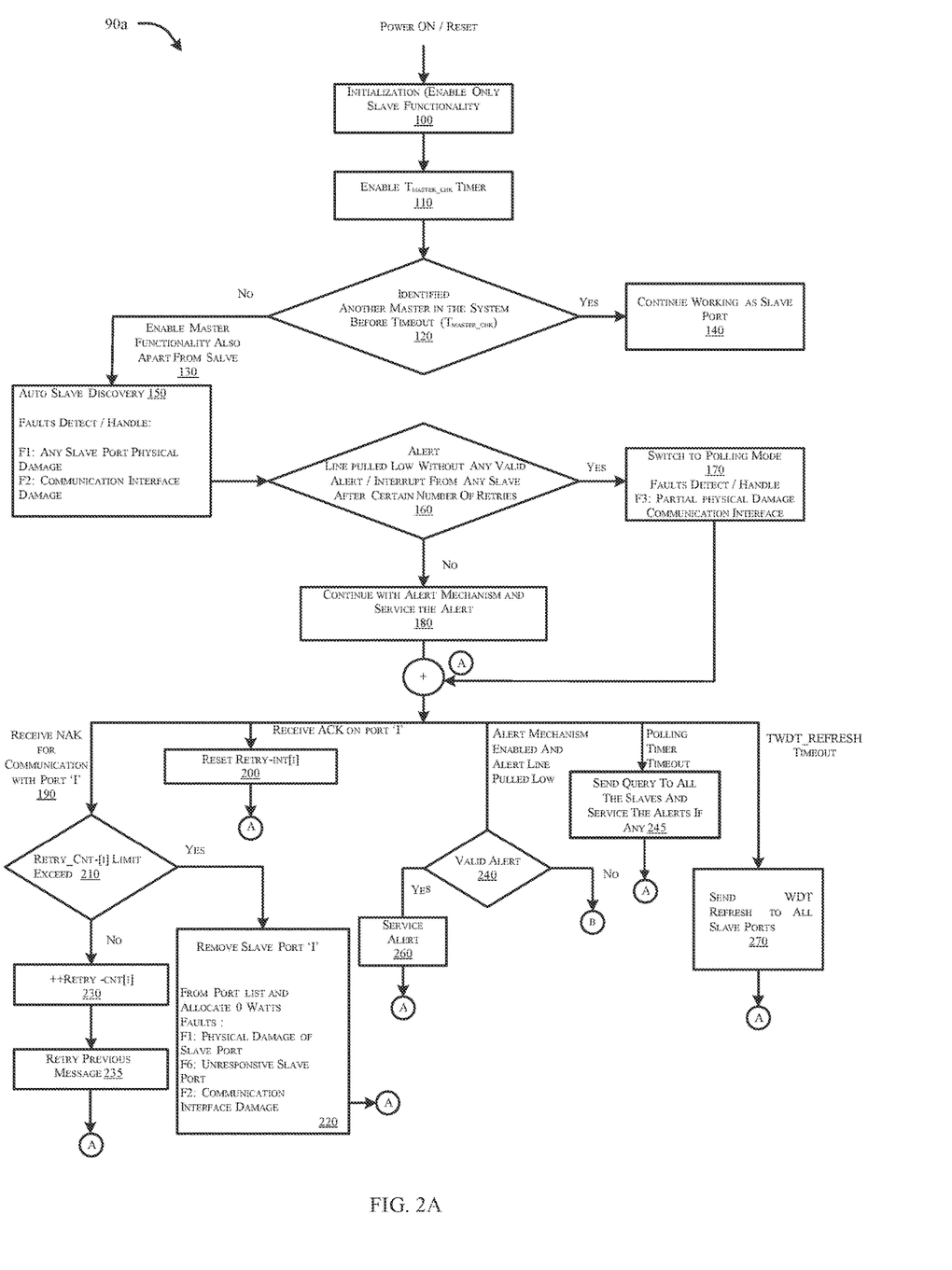
FIG. 2a and FIG. 2b show flowcharts depicting a portion of master functioning which is used as an embedded algorithm in a multiport power sourcing device of the present embodiment to handle fault management in the multiport power sourcing device, in accordance with an embodiment of the present disclosure.
Figure 2B:
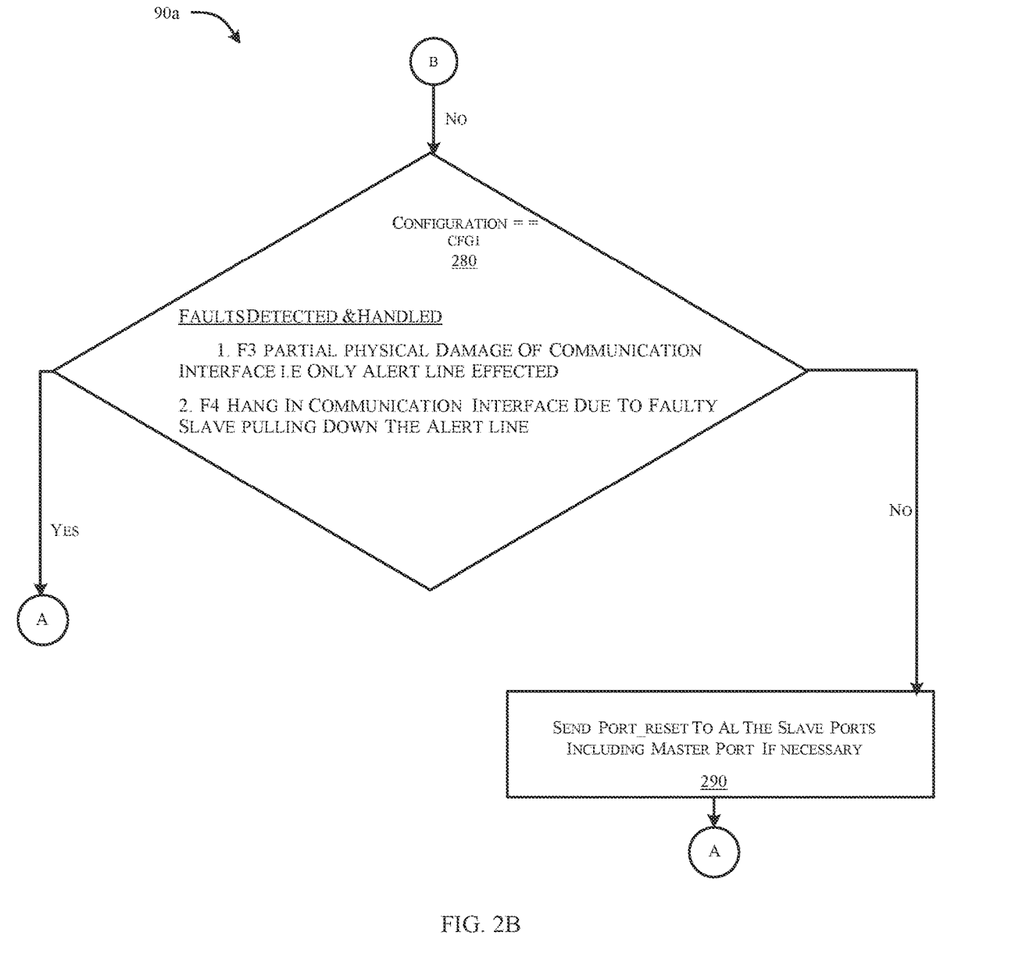
Figure 3:
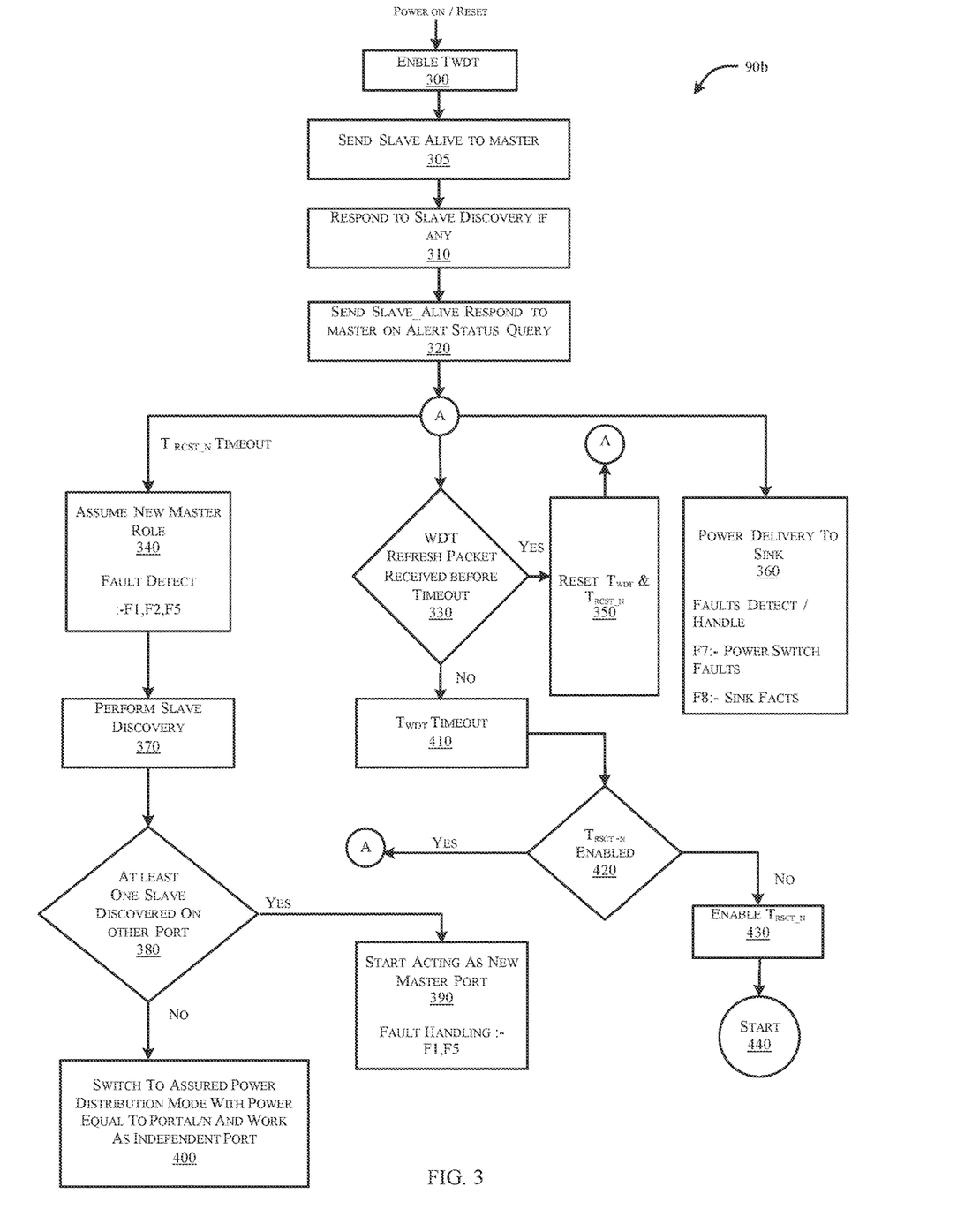
FIG. 3 shows a flowchart depicting a portion of slave functioning which is used as an embedded algorithm in a multiport power sourcing device of the present embodiment to handle fault management in the multiport power sourcing device, in accordance with an embodiment of the present disclosure.

In an embodiment, connected device faults can be identified and handled by the slave as per the protocol established between the corresponding port and the connected device, or by port latch off or disable causing the disconnection of faulty devices from the corresponding port. Referring to FIGS. 2a, 2b and 3, FIG. 2a and FIG. 2b show flowcharts 90a representation depicting a portion of master 20 functioning which is used as an embedded algorithm in the system of the present embodiment to handle fault management in the multiport power sourcing device, in accordance with an embodiment of the present disclosure.

When the power of the MPSD is turned on, initialization of all the ports of the device takes place, initialization of the master port during power on or after the port reset is represented in step 100, where only slave functionality is enabled in the port as part of initialization. Further, a timer in the port which may be represented as $T_{MASTER\_CHK}$ may be enabled in step 110. Further, the port waits for $T_{MASTER\_CHK}$ timeout or for receiving communication from any another master in the system indicating active master identification in the system before the $T_{MASTER\_CHK}$ times out in step 120.

If active master is already present, the port is instructed to continue the slave functionality without enabling master functionality at step 140, which means port continues to act as slave port since another master port is identified in the system. If active master is not identified, the port is instructed to enable the operation of the master along with the operation of the slave, which means port starts functioning fully as the master port as mentioned at 130.

Master port performs slave discovery of the plurality of the slave present in the multiport power sourcing device at step 150, by sending slave discovery request over the shared communication interface and receiving the slave discovery response from each of the physically present plurality of slave ports of the multiport power sourcing device, by adding the discovered slave ports to the slave ports list in the database, which is referred for power distribution and redistribution by the master. Further, at step 150, fault identified as 1 in FIG. 1 i.e., physical damage of one or more of the plurality of slave ports results in no slave discovery response from the corresponding slave port, thus isolating faulty slave(s) port from the non-faulty ports, blocking the power distribution to the faulty ports. Further, at step 150, fault identified as 2 in FIG. 1 i.e., physical damage of communication interface results in failure of slave discovery of all the ports resulting in no slave discovery in the system and each of the plurality of ports starts acting as assured port with $$P\_ALLOC\_p = \frac{PTOTAL}{N},$$

where P_ALLOC_p is power allocated to port p, PTOTAL is total shared power of the multiport power sourcing device, N is total number of ports sharing the power in the multiport power sourcing device.

On completing the auto slave discovery in step 150, if the alert line is pulled low with or without any valid alert or interrupt from any slave, where on seeing the alert line pulled low, master sends query i.e., alert status query to each of the plurality of slave ports and checks the response from the slaves to figure out if one or more of the slaves has a valid interrupt or alert that needs to be serviced by the master. If the alert line is pulled low without a valid alert or interrupt from any slave even after certain number of retries, the master switches to a polling mode, enables a polling timer and masks the alert line in step 170, else if the alert line is pulled low due to a valid alert or interrupt from slave, master continues with the alert mechanism and service the alert in step 180, or if alert line is not pulled low in step 160, master continues with the alert mechanism in step 180. Fault identified as 3 in FIG. 1, Partial physical damage to the communication interface with only alert line effected i.e., alert line pulled low without any valid alert or interrupt from slave results in master to switch to polling mentioned in step 170.

If No Acknowledgement (NAK) is received for the communication with any of the port, for example port "I" as mentioned at 190, where communication can be a watchdog refresh packet or any other packet related to multiport power distribution, master checks if communication retry counter i.e., RETRY_CNT[I] exceeded predefined limit in step 210. If RETRY_CNT[I] doesn't exceed the predefined limit, master increments the RETRY_CNT[I] by value of 1 in step 230 and retries sending the same message again in step 235 and returns to A. If RETRY_CNT[I] exceeded the predefined limit i.e., NAK response is received from the port "I" for predefined number of retries either due to physical damage of slave port "I" identified as fault 1 in FIG. 1 or due to unresponsive slave port "I" identified as fault 6 in FIG. 1 or due to physical damage of the communication interface identified as fault 2 in FIG. 1, master removes the slave port "I" from the slave ports list and deallocates the power allocated to port "I" i.e., allocate 0 watts.

If Acknowledgement is received for any communication with port "I", RETRY_CNT[I] is reset to 0 in step 200 and continues to A.

If the alert line is pulled low at any instant and alert mechanism is enabled, master checks if alert line is pulled low due to valid interrupt from at least one of the plurality of the slaves in step 240. If alert is valid, master services the alert in step 260 and continues to A. If alert is not valid i.e., alert line is either pulled low due to physical damage that happened to alert line during the operation, identified as fault 3 in FIG. 1 or alert line is pulled low by a faulty behaving slave resulting in communication hang, identified as fault 4 in FIG. 1, master in one configuration i.e., CFG1 in step 280 continues to A without taking any action, In another configuration, master sends port reset command to all the slaves, including the master port if necessary, in step 290 and continues to A. If the polling timer is timed out, a query is sent to all the slaves and the alerts are serviced if any in step 245.

If WATCHDOG_REFRESH timer i.e., $T_{WDT\_REFRESH}$ timeout happens, WATCHDOG_REFRESH packet is sent to all the slaves sequentially one after the other in step 270 and continues to A. $T_{WDT\_REFRESH}$ timer is a continuously running timer in master port which restarts itself on its timeout.

In light of the above, referring to FIG. 3, FIG. 3 shows a flowchart representation depicting a portion of slave functioning which is used as an embedded algorithm in the multiport power sourcing device of the present embodiment to handle fault management in the multiport power sourcing device, in accordance with an embodiment of the present disclosure.

As part of slave functionality, the watchdog timer, $T_{WDT}$ is enabled upon resetting or turning the power of the system ON in step 300. Slave proceeds with process of sending slave alive mechanism in step 305 by pulling the alert line low indicating alert or interrupt to the master. A response to the slave discovery request, if any, received from the master is to be sent in step 310. Consequently, a SLAVE_ALIVE response indicating that the slave is in active state is sent as a response to the alert status query in step 320 and slave process continues to A If the WDT refresh packet is received before watchdog timer timeout in step 330, $T_{WDT}$ and the $T_{RCST\_n}$ timers are reset in step 350 and slave process continues to A, else the $T_{WDT}$ is timed out in step 410 due to failure in receiving the watchdog refresh packet. Consequently, $T_{RCST\_n}$ is enabled in step 420 and 430, and further performs port reset and continues to start i.e., step 300. If a Role change staggered timer $T_{RCST\_n}$ timeout which happens when $T_{RCST\_n}$ is not reset by the master before the timeout, indicates either unresponsive master port due to temporary hang identified as fault 5 in FIG. 1 or unresponsive master port due to physical damage identified as fault 1 in FIG. 1 or communication interface damage identified as fault 2 in FIG. 1, happens the new master port role is assumed by the slave port in step 340. On assuming the new master role, slave discovery is performed in step 370. If at least one slave port is discovered on any other port in step 380, which indicates slave discovery request and response communication across the ports is successful which implies communication interface damage identified as fault 2 is not the reason for role change staggered timer timeout indicating fault 1 or fault 5 and the slave port starts acting as the new master port in step 390.

If at least one slave is not discovered on the port in step 380, power distribution mode is switched to assured power distribution mode with $$P\_ALLOC\_p = \frac{PTOTAL}{N},$$

and port starts to work as independent port in step 400.

Subsequently, slave, while performing power delivery to the device in step 360, monitors the power lines over which power is delivered to the connected devices to identify power switch faults indicated as fault 7 in FIG. 1, and requests a lesser wattage until power switch fault is recovered. Further, in step 360, slave handles the faulty device connected to port indicated as fault 8 in FIG. 1 as per the protocol established between the port and the connected device or by performing port latch off or disable causing the faulty device disconnection.

It would be appreciated that although the proposed system 10 has been elaborated as above to include all the main units, it is conceivable that actual implementations are well within the scope of the present disclosure, which can include without any limitation, only a part of the proposed units or a combination of those or a division of those into sub-units in various combinations across multiple devices that can be operatively coupled with each other, including in the cloud. Further, the units can be configured in any sequence to achieve objectives elaborated. Also, it can be appreciated that proposed system 10 can be configured in a computing device or across a plurality of computing devices operatively connected with each other, where the computing devices can be any of a computer, a laptop, a smart phone, an Internet enabled mobile device and the like. Therefore, all possible modifications, implementations and embodiments of where and how the proposed system 10 is configured are well within the scope of the present invention.

The above-mentioned method is envisioned to be performed using appropriate physical devices that may be appreciated by a person skilled in the art. As such, all physical devices which may include respective various physical materials serve their respective functions and all such materials and their respective manufacturing methods are intended to be covered by this disclosure.

Thus, it will be appreciated by those of ordinary skill in the art that the diagrams, schematics, illustrations, and the like represent conceptual views or processes illustrating systems and methods embodying this invention. The functions of the various elements shown in the figures can be provided through the use of dedicated hardware as well as hardware capable of executing associated software. Similarly, any switches shown in the figures are conceptual only. Their function can be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

In the foregoing description, numerous details are set forth. It will be apparent, however, to one of ordinary skill in the art having the benefit of this disclosure, that the present invention can be practiced without these specific details. In some instances, well-known structures and devices are shown in block diagram form, rather than in detail, to avoid obscuring the present invention.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps can be present, or utilized, or combined with other elements, components, or steps that are not expressly referenced. Where the specification claims refer to at least one of something selected from the group consisting of A, B, C and N, the text should be interpreted as requiring only one element from the group, not A plus N, or B plus N, etc.

While the foregoing describes various embodiments of the invention, other and further embodiments of the invention can be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

The present disclosure provides a system and method for fault identification and fault handling in a multiport power sourcing device.

The present disclosure provides an automated system and method for fault management in the multiport power sourcing device.

The present disclosure provides a simple, cost-effective and a faster system and method for fault identification and fault handling in a multiport power sourcing device.

The present disclosure provides a reliable and efficient system and method for fault management in the multiport power sourcing device.

The present disclosure provides a method to handle multiple faults such as one of a permanent physical damage in one or more of the plurality of ports, a complete damage of the shared communication interface, a partial damage of the shared interface with only alert line effected causing communication blockage between the master port and the plurality of slave ports, an unresponsive master port either due to temporary hang or permanent physical damage, unresponsive behaviour of one or more of the plurality of slave ports during communication, hang of the physical communication medium due to fault in one or more of the plurality of slave ports, power switch issue in one or more of the plurality of ports, a faulty device connected to the corresponding plurality of ports, or a combination thereof.

What is claimed is:

1. A system for fault identification and fault handling in a multiport power sourcing device, the system comprising:
the multiport power sourcing device comprising a plurality of ports,
wherein the plurality of ports comprises a plurality of slave ports and a master port,
wherein power distribution across the plurality of ports in the multiport power sourcing device is controlled by circuitry functioning as a coordinated pair of master and slaves using a request-response communication over a shared communication interface placed within the multiport power sourcing device, wherein the master is protocol agnostic and has one instance and the slaves have one instance per port,
wherein the slaves perform power delivery over a physical interface and the master maintains a record of power allocated to each of the slaves and controls power distribution across the plurality of ports,
wherein each of the plurality of ports comprises a processor associated with the master and the slaves executing corresponding instructions,
wherein the master is configured to send a slave discovery request to each of the plurality of slave ports, receive a slave discovery response from a plurality of slave ports that are physically present on the multiport power sourcing device, and add data associated with each of one or more discovered slave ports to a slave port list in a master database upon receiving the slave discovery response from the plurality of slave ports;
wherein the master is configured to reset a watchdog timer in each of the plurality of ports together by sending a watchdog refresh instruction periodically to each of the plurality of ports;
wherein each of the plurality of ports generates a watchdog timer timeout notification upon failing to receive the watchdog refresh instruction from the master due to at least one first fault associated with the multiport power sourcing device;
each of plurality of ports generates its corresponding port reset upon the watchdog timer timeout notification to resolve at least one first fault associated with a corresponding port;
each of the plurality of ports comprises a role change staggered timer which is triggered upon the watchdog timer timeout notification of the corresponding port, which is reset upon receiving the watchdog refresh instruction from the master, wherein the role change staggered timer times out upon failing to receive the watchdog refresh instruction, thereby indicating at least one second fault associated with the multiport power sourcing device; and
one of the plurality of slave ports, for which the role change staggered timer times out first, performs a role change to start functioning as a new master port and redistribute power to the plurality of ports for restoring power equilibrium in the multiport power sourcing device, each of the plurality of ports monitors and delivers power to one or more connected devices, for handling the at least one first fault, the at least one second fault, at least one third fault, or a combination thereof corresponding to one of temporary or permanent faults, within the multiport power sourcing device.

2. The system as claimed in claim 1, wherein the plurality of ports comprises at least one of a Universal Serial Bus (USB) Type-C port or a USB Type-A port, or a combination thereof.

3. The system as claimed in claim 1, wherein the power distribution within the multiport power sourcing device is controlled by a coordinated pair of the master port and the plurality of slave ports using a request-response communication over the shared interface.

4. The system as claimed in claim 1, wherein each of the plurality of ports is configured to store a pre-defined protocol, wherein each of the plurality of ports is configured to distribute power over one or more physical interfaces upon being controlled by the master port.

5. The system as claimed in claim 1, wherein the master port and the plurality of slave ports are associated with a shared communication interface in the multiport power sourcing device, wherein the shared communication interface comprises bus protocol signals along with an alert line, wherein the alert line is inband or outband.

6. The system as claimed in claim 1, wherein the at least one first fault comprises one of a permanent physical damage in one or more of the plurality of ports, a complete damage of the shared communication interface, a partial damage of the shared communication interface with only an alert line affected causing communication blockage between the master port and the plurality of slave ports, an unresponsive master port either due to temporary hang or permanent physical damage, unresponsive behaviour of one or more of the plurality of slave ports during communication, hang of a physical communication medium due to fault in one or more of the plurality of slave ports, or a combination thereof, wherein the at least one second fault comprises one of an unresponsive master port condition either due to a temporary hang or the permanent physical damage, a physical damage to the shared communication interface, or a combination thereof, wherein the at least one third fault comprises one of a power switch issue in one or more of the plurality of ports, a faulty device connected to the corresponding plurality of ports, or a combination thereof.

7. The system as claimed in claim 6, wherein the physical damage to the one or more of the plurality of ports comprises the physical damage in the master port, occurs either before a start of an operation or during the operation, results in a failure to receive the watchdog refresh instruction in all of the plurality of slave ports, causing the watchdog timer to expire further resetting all the plurality of slave ports, and enabling and causing a role change staggered timer of all the plurality of slave ports to timeout, a first of the plurality of slave ports to experience role change staggered timer timeout first assumes a new master role, changes a role and start functioning as a new master port upon discovering at least one of the plurality of slave ports and redistributes the power across the discovered at least one of the plurality of ports and restores the power equilibrium.

8. The system as claimed in claim 6, wherein the physical damage to the one or more ports comprises the physical damage in one of the plurality of slave ports before a start of an operation and results in failure in the slave discovery, causing the master to block the power distribution to the corresponding slave port.

9. The system as claimed in claim 6, wherein the physical damage to the one or more ports comprises the physical damage in one of the plurality of slave ports during an operation corresponds that to No Acknowledgement for the communication from master port, causing the master port to remove the data corresponding to one of the plurality of slave ports from the slave port list stored in the database, and resetting a power allocation to the corresponding port to zero.

10. The system as claimed in claim 6, wherein the damage to the physical communication medium results in expiring each one of, the watchdog timer and each one of the role change staggered timer of the plurality of ports, as no communication takes place between the plurality of ports resulting in no active master in the system and switching each of the plurality of ports to a power distribution state.

11. The system as claimed in claim 6, wherein the hang of the physical communication medium due to fault in one or more of the plurality of slave ports corresponds to one or more of the plurality of slave ports being faulty, pulling down an alert line, blocking the master from sending the watchdog refresh instruction, and resulting in the watchdog timer of all of the plurality of slave ports expiring, further resulting in port reset of all the plurality of slave ports to resolve a faulty alert indication to the master port, and wherein the master, after identifying an invalid alert indication for a pre-defined number of retries, will send a reset command to each of the plurality of ports including the master port and the plurality of slave ports, for a faster recovery of the fault without waiting for the recovery due to port reset caused by watchdog timer timeout.

12. The system as claimed in claim 11, wherein the partial physical damage to the communication interface with only the alert line affected causing faulty alert indication is due to the alert line pulled low permanently due to the physical damage either during an operation or before start of the operation, and wherein the master port, after performing the slave discovery and upon identifying the faulty alert indication without any request from the slaves after a pre-defined number of retries, switches to a polling mode, wherein the polling mode corresponds to a mode where the master port periodically polls each of the plurality of slave ports for any alerts and handles the alerts instead of relying on the alert line.

13. The system as claimed in claim 12, wherein a faulty device connected to one or more of the plurality of ports is handled by the corresponding slave either as per a protocol established between the port and the connected device or by port latch-off or port disable causing disconnection of an attached device.

14. The system as claimed in claim 6, wherein the unresponsive master results in failure of receiving a refresh packet by each of the plurality of slave ports causing the watchdog timer to expire in each of the plurality of the slave ports causing port reset and further may cause a role change staggered timer to expire in the plurality of slave ports, wherein at least one of the plurality of slave ports whose staggered timer expires first assumes a new master role and takes up the new master role after discovering at least one of the plurality of slave ports on any other port and redistributes the power to all successfully discovered ports, wherein the unresponsive master which is an old master having an old master port, upon recovery waits for some configurable amount of time within which if the old master receives a slave discovery request, the old master port concludes that another master is present in the system and the old master stops acting as the master and continues acting as the at least one slave port.

15. The system as claimed in claim 14, wherein the master is configured to:

if an old master recovers before any other slave port assumes the new master role, then the old master will start working as the master again, performing the slave discovery, and restoring the power equilibrium;

if the old master recovers after any other slave port starts acting as the new master, then the old master upon identifying the new master will continue working as a slave port; and if the old master recovers during a transition process of any other slave port to the new master role, either the old master port or a new port starts working as the master port depending on who wins a communication interface arbitration.

16. The system as claimed in claim 1, wherein one or more unresponsive slave ports during communication results in the watchdog timer expiring in the one or more unresponsive slave ports causing a corresponding port reset, and the one or more unresponsive slave ports, upon reset exit, send an alive indication to the master port and the master port reallocates previously allocated power to the one or more unresponsive slave ports.

17. The system as claimed in claim 1, wherein temporary or permanent power switch faults in any of the plurality of ports results in an allocated power not being delivered to a device connected to the corresponding port, each of the plurality of ports identifies such faults by monitoring a VBUS line over which power is delivered to the device connected and further upon identifying such faults, requests for power allocation of a pre-defined power range until a fault is recovered and starts requesting for allocation of power more than the pre-defined power range after a fault recovery.

18. A method for fault identification and fault handling in a multiport power sourcing device, the method comprising:

receiving, at the multiport power sourcing device, a slave discovery request in a sequential manner by a plurality of slave ports over a shared communication interface, wherein the slave discovery request is generated by a master port;

receiving, at the multiport power sourcing device, a slave discovery response from the plurality of slave ports as a response for the slave discovery request, upon being physically present on the multiport power sourcing device, for enabling a discovery of a presence of the plurality of slave ports;

adding, at the multiport power sourcing device, data by the master port to a slave port list upon receiving the slave discovery response from the plurality of slave ports, wherein the data is associated with one or more of the plurality of slave ports discovered;

resetting, at the multiport power sourcing device, a watchdog timer of each of the plurality of slave ports periodically, upon receiving a refresh instruction from the master port;

generating, at the multiport power sourcing device, a timeout notification by one or more of the plurality of slave ports, when one or more of the plurality of slave ports fail to receive the refresh instruction by the master port due to at least one first fault associated with the plurality of slave ports;

resolving, at the multiport power sourcing device, one or more of the plurality of slave ports that failed to receive the refresh instruction, by generating a corresponding port reset of one or more of the plurality of slave ports whose watchdog timer timed out;

assuming, at the multiport power sourcing device, a new master role by a first of the plurality of slave ports to experience a role change staggered timer timeout, wherein a role change staggered timer of a corresponding plurality of slave ports expires upon failing to receive a watchdog refresh instruction, thereby indicating at least one second fault; and redistributing, at the multiport power sourcing device, of power to a set of ports including the plurality of slave ports and a new master port by the new master port for restoring power equilibrium in the multiport power sourcing device, monitoring and delivering power to one or more connected devices by each of the set of ports for handling at least one of the first fault, at least one of the second fault, at least one third fault, or a combination thereof corresponding to one of temporary faults or permanent faults within the multiport power sourcing device, wherein the at least one third fault comprises one of a power switch issue in one or more of the set of ports, a faulty device connected to a corresponding port of the set of ports, or a combination thereof.

* * * * *

UNITED STATES PATENT AND TRADEMARK OFFICE
CERTIFICATE OF CORRECTION

| | |
|---|---|
| PATENT NO. | : 11,669,399 B2 |
| APPLICATION NO. | : 17/665431 |
| DATED | : June 6, 2023 |
| INVENTOR(S) | : Sirisha Munnangi et al. |

It is certified that error appears in the above-identified patent and that said Letters Patent is hereby corrected as shown below:

On the Title Page

Item (30) Insert "Foreign Application Priority Data" section with the following information:
-- India Patent Application No. 202141032679, filed on July 20, 2021 --

Signed and Sealed this
First Day of August, 2023

Katherine Kelly Vidal
*Director of the United States Patent and Trademark Office*